Nov. 1, 1966     C. G. WRESTLER, JR     3,282,242
ARTIFICIAL HORIZON INSTRUMENT FOR AIRCRAFT OPERATION
Filed April 2, 1964                    2 Sheets-Sheet 1

INVENTOR.
CLIFTON G. WRESTLER JR.
BY: Harry M. Saragovitz,
    Edward J. Kelly,
    Herbert Berl &
    James W. Colvin Nov. 1, 1966 C. G. WRESTLER, JR 3,282,242
ARTIFICIAL HORIZON INSTRUMENT FOR AIRCRAFT OPERATION
Filed April 2, 1964
2 Sheets-Sheet 2

INVENTOR.
CLIFTON G. WRESTLER JR.
BY: Harry M. Saragovitz,
Edward J. Kelly,
Herbert Berl, &
James W. Colvin United States Patent Office 3,282,242
Patented Nov. 1, 1966

3,282,242
ARTIFICIAL HORIZON INSTRUMENT FOR
AIRCRAFT OPERATION
Clifton G. Wrestler, Jr., 48 Courtney Ave.,
Newport News, Va.
Filed Apr. 2, 1964, Ser. No. 356,995
3 Claims. (Cl. 116—114)

The invention disclosed herein may be manufactured and used by or for the Government for governmental purposes without payment to me of any royalty thereon.

This invention relates to aircraft instrumentation and more particularly to an artificial horizon instrument for assisting a pilot to fly an aircraft under low visibility or instrument flying conditions.

Present day aircraft are equipped with horizon indicating gyroscopic instruments in the form of pitch and roll indicators from which the pilot can determine the attitude of his aircraft relative to a horizontal plane. Such an instrument normally has a relatively small dial set into the instrument panel of the aircraft and provided with a fixed horizon line and a movable indicator, frequently in the form of a generalized or diagrammatic end view of an aircraft. This instrument indicates the angle of climb and bank of the aircraft and the indicator is kept in a horizontal position by a gyroscope mounted in the instrument or by being electrically connected to a main gyroscope, such as the gyroscope of an automatic pilot.

While such an instrument is sufficiently accurate for general aeronautical purposes, because of its small size it is difficult to observe and watching such an instrument for an extended period of time induces pilot fatigue and distracts the pilot's attention from other instruments and procedures necessary for the safe operation of the aircraft under adverse conditions.

It is therefore among the objects of the present invention to provide a climb and bank indicating or artificial horizon instrument which produces an aircraft attitude indication which the pilot can see without having to direct his attention to a particular instrument in the instrument panel.

A further object resides in the provision of an artificial horizon instrument in an aircraft which instrument is gyroscopically controlled and functions by directing a flat beam of light onto the windshield of the aircraft to provide a substantially straight line of light across the windshield.

A still further object resides in the provision of an aircraft instrument of the character described which provides an artificial horizon indication in the form of a line of visible light extending across the windshield of the aircraft in front of the pilot and gyroscopically maintained in a horizontal position regardless of changes in the flight attitude of the aircraft.

An additional object resides in the provision of an aircraft artificial horizon instrument of the character indicated above, which can be conveniently mounted at an appropriate location in an aircraft rearwardly of the aircraft windshield and can be operated through remote control apparatus from a main or master gyroscope or may, if desired, have its own gyroscope.

Other objects and advantages will become apparent from a consideration of the following description and the appended claims in conjunction with the accompanying drawings wherein:

Figure 1:
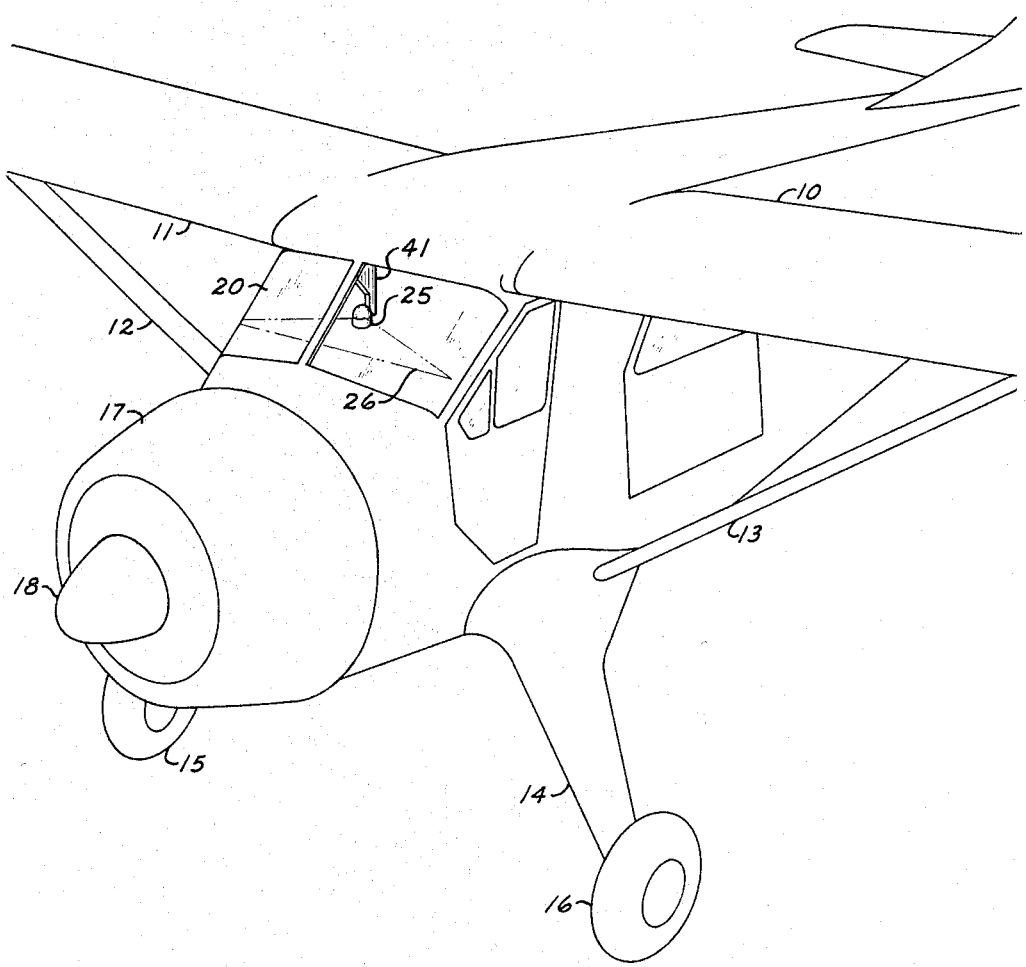
FIG. 1 is a diagrammatic perspective view of the front portion of an aircraft with an artificial horizon instrument illustrative of the invention mounted in the pilot's compartment of the aircraft.

With continued reference to the drawings, FIG. 1 shows the mounting of the instrument in a conventional aircraft. The aircraft illustrated has a fuselage 10, a high wing 11 extending across the top of the fuselage and supported by braces 12 and 13, landing gear struts, as indicated at 14, extending downwardly from the lower portion of the fuselage and carrying the landing wheels 15 and 16. An engine is mounted on the front end of the fuselage and is covered by an engine cowling 17 and a propeller 18 is carried by the engine and disposed in front of the engine cowling. The aircraft has a pilot's compartment in the fuselage immediately to the rear of the engine and the front wall of this compartment is constituted by a windshield 20 through which the pilot has visibility to observe the natural horizon when flying as well as to watch the ground, air strips, other aircraft and any other objects or terrain that he needs to see when flying or landing.

The artificial horizon instrument is mounted within the pilot's compartment rearwardly of the windshield 20 and is indicated at 25. This instrument projects a thin line of light, as indicated at 26, onto the windshield of the aircraft and this line of light coincides with the natural horizon, being maintained in a horizontal position by gyroscopic control.

Figure 2:
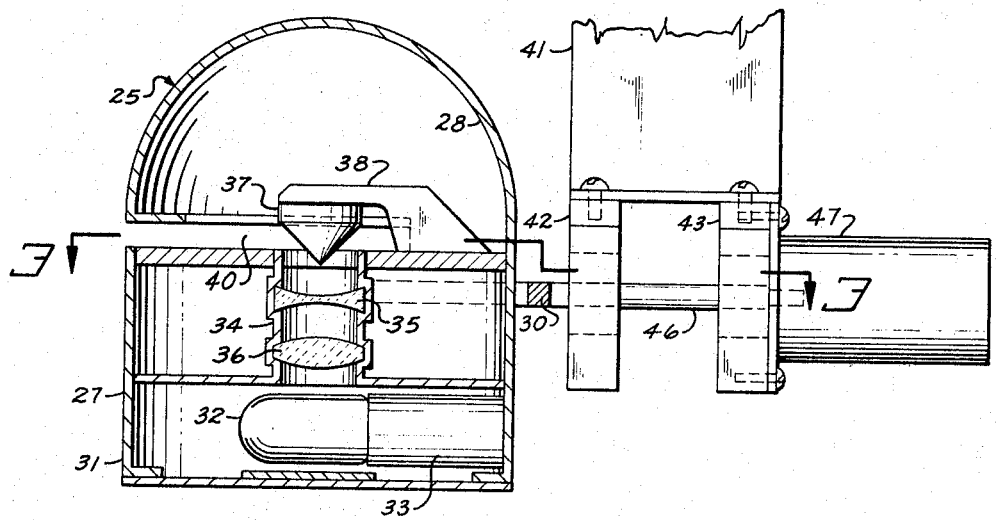
FIG. 2 is a longitudinal cross sectional view of the instrument shown in FIG. 1.
Figure 3:
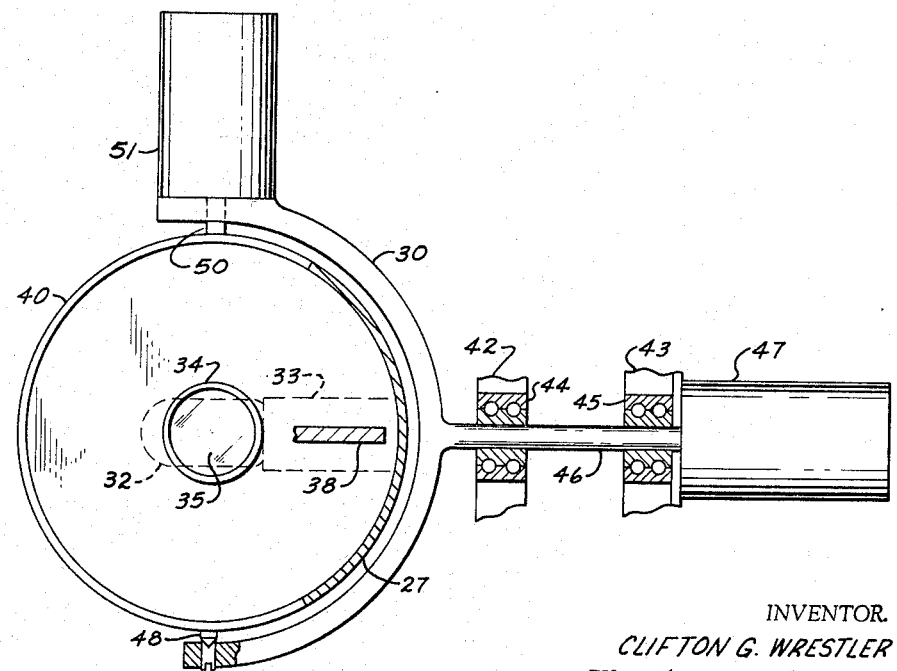
FIG. 3 is a transverse cross sectional view of the instrument substantially on a plane indicated by the line 3—3 on FIG. 2.

A suitable form of light projecting instrument is diagrammatically illustrated in FIGS. 2 and 3 and comprises a generally cylindrical housing 27 provided with a dome-shaped or semi-spherical cover 28 and mounted in a gimbal bracket 30. The lower portion of the housing comprises a closed light box 31 having therein a suitable lamp or light bulb 32 mounted in a conventional socket 33. A lens tube 34 extends upwardly from the top wall of the light box 31 centrally of the housing and contains condenser lenses, as indicated at 35 and 36, which direct a beam of light onto a reflector 37 of inverted conical shape maintained in a position coaxially of the tube 34 by a mounting bracket 38. The reflector 37 reflects the light from the lamp 32 in a direction radially of the housing 27 and a portion of the housing wall at the upper end of the housing is cut away to provide a partly circumferential, narrow slot 40 through which light passes from the reflector 37. The instrument is mounted in the pilot's compartment or cockpit by a suitable bracket 41 in a position such that the narrow band of light emanating through the slot 40 strikes the windshield in a narrow band or line of light, as indicated at 26 in FIG. 1. The lamp is supplied with electrical power from the power supply of the associated aircraft and a suitable switch or rheostat is included in the circuit for controlling the lamp.

In the arrangement illustrated the bracket is secured to the top of the pilot's compartment and extends downwardly therefrom, terminating at its lower end in a pair of bearing blocks 42 and 43. These bearing blocks contain antifriction ball bearings, as indicated at 44 and 45 respectively, and the gimbal bracket 30 has a shaft or stem 46 which extends through these bearings. A remote control or Selsyn component 47 is mounted at one end on the bearing block 43 and operatively connected to the shaft 46 to turn the shaft in response to control current supplied from a main or master gyroscope device.

The bracket 30 is generally semicylindrical in shape and partly surrounds the housing 27. At its ends this bracket is provided with diametrically opposite bearings and a bearing pin 48 extends from one side of the housing 27 into the bearing near one end of the bracket 30. A shaft 50 extends from the opposite side of the housing through the corresponding bearing provided in the bracket 30 and is connected to a remote control or Selsyn component 51 mounted on the corresponding end portion of the gimbal bracket. The remote control component 51 is also connected to the main gyroscope of the aircraft and is responsive to electrical current supplied from the main gyroscope to control the position of the light producing instrument 25.

It will be noted that the axes of the two remote control units 47 and 51 are perpendicular to each other so that the position of the instrument will be controlled in both the *x* and *y* spatial planes thereby maintaining the instrument itself and the light beam projected from the instrument is a true horizozntal position.

The master gyroscope and the connections from the master gyroscope to the remote control units 47 and 51 have not been illustrated since the master gyroscope and the electrical connections may be entirely conventional and an illustration is believed to be unnecessary.

With the light projecting, artificial horizon instrument, as described above in operation in the aircraft, the pilot has before him a large and clearly visible horizon indication which he can see by merely looking in the direction of the windshield and without having to fix his attention on any other instrument or instruments mounted in the instrument panel of the aircraft. Thus, when flying at night or under low visibility weather conditions, the pilot can control the aircraft to maintain it in precisely level flight or at a desired angle of climb or descent, receiving his horizon indication by merely looking to or through the windshield in the normal manner of flying. While it is considered unnecessary, the windshield could be provided with indicating marks or indicia to show the magnitude of the angle of bank or climb or descent of the aircraft.

While a suggested form of the invention has been hereinabove described and illustrated in the accompanying drawings, the scope of the invention is not limited to the form of the invention so described and illustrated but is commensurate with the scope of the appended claims.

I claim:

1. In an aircraft artificial horizon instrument assembly, a light projector comprising a housing having in its lower portion a light box, a lamp component in said light box, a cover for said housing, said housing having an elongated narrow slot therein adjacent said cover, means in said housing to project a thin, wide beam of light through said slot, and gyroscopically controlled mounting means for mounting said light projector in an aircraft with the light beam in a substantially horizontal position.

2. In an aircraft artificial horizon instrument assembly, a light projector comprising a housing having a narrow elongated slot therein and having a closed light box in one end spaced from said slot, a cover closing the other end of said housing and having its edge extending along said slot, means in said housing for projecting a thin beam of light through said slot, a gimbal bracket supporting said housing for rotational movements about a first axis, a mounting bracket supporting said gimbal bracket for rotational movements about a second axis perpendicular to said first axis, and gyroscopically controlled devices connected to said housing and said gimbal bracket for controlling movements of said housing about said first and second axes.

3. An artificial horizon instrument for aircraft comprising a closed cylindrical housing, a semicircular slot in the wall of said housing intermediate its ends, an electric lamp positioned in said housing adjacent one of said ends, a conical reflector affixed in said housing in alignment with said electric lamp and opposite said semicircular slot, optical focusing means positioned in said housing between said electric lamp and said conical reflector, a gimbal bracket rotatably fixed to the structure of said aircraft for rotation about a first axis, said closed housing carried by said gimbal bracket for rotational movement about a second axis perpendicular to said first axis, and gyroscopic means controlling the movements of said gimbal bracket about said first axis and the movements of said closed housing about said second axis, said housing positioned rearwardly of the windshield of said aircraft whereby a narrow flat beam of light from said semicircular slot is projected to the windshield of said aircraft and extends across the width thereof.

References Cited by the Examiner

UNITED STATES PATENTS

| | | | |
|---|---|---|---|
| 1,804,764 | 5/1931 | Grant | 88—24 |
| 1,916,567 | 7/1933 | Grant | 88—24 |
| 2,081,746 | 5/1937 | Hollmann | 334—86 |
| 2,138,875 | 12/1938 | Miessner | 116—114 |
| 2,178,637 | 11/1939 | Link | 88—24 |
| 2,299,682 | 10/1942 | Conant | 88—24 |
| 2,448,023 | 8/1948 | Folland et al. | 33—204.2 |
| 2,514,541 | 7/1950 | Garrison | 88—24 |
| 2,574,119 | 11/1951 | Mottu | 88—24 |
| 2,676,515 | 4/1954 | Diehl | 88—24 |
| 2,924,026 | 2/1960 | Domeshek | 88—24 |

FOREIGN PATENTS

| | | |
|---|---|---|
| 704,471 | 2/1931 | France. |
| 316,025 | 12/1913 | Germany. |
| 543,822 | 3/1956 | Italy. |

LOUIS J. CAPOZI, *Primary Examiner.*